Feb. 7, 1933.  H. G. PHELPS  1,896,418
REMOTE CONTROL APPARATUS
Filed Feb. 8, 1930
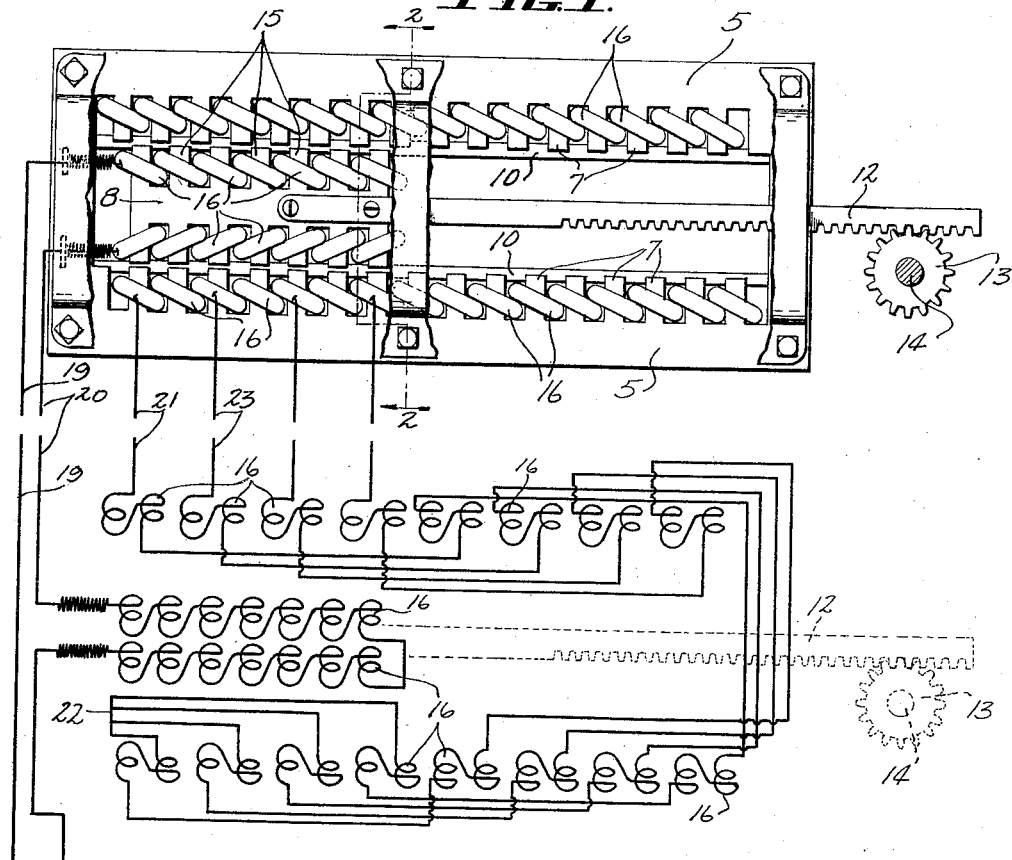
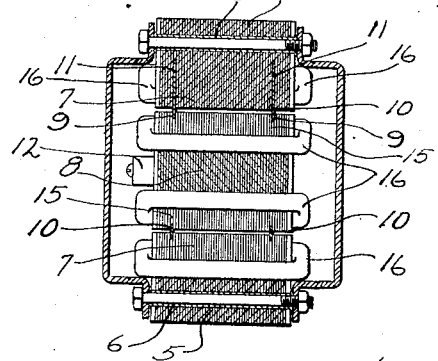
Inventor
Hugh G. Phelps.
By Wheeler, Wheeler & Wheeler
Attorneys Patented Feb. 7, 1933

1,896,418

UNITED STATES PATENT OFFICE

HUGH G. PHELPS, OF MILWAUKEE, WISCONSIN, ASSIGNOR OF ONE-HALF TO EDWARD G. PHELPS, OF MILWAUKEE, WISCONSIN

REMOTE CONTROL APPARATUS

Application filed February 8, 1930. Serial No. 426,994.

This invention relates to improvements in remote control apparatus.

It is the object of the invention to provide a novel and simple device for the electrical transmission of motion from one point to another with such accuracy that a sub-control will assume at a remote point the exact position of the master control.

It is a further object of this invention to provide remote control apparatus in which a very few wires are needed to operate the sub-control noiselessly and with precision through an infinite number of positions within its range of operation.

In the drawing:

Figure 1 is a view partially in side elevation and partially in the form of an electrical diagram showing the identical pieces of apparatus used for the master and remote control device.

Figure 2 is a view taken in section in a plane on lines 2—2 of Figure 1.

Like parts are identified by the same reference characters throughout the two views.

As above indicated the two control mechanisms are mechanically and electrically identical. It is possible to operate any desired number of sub-controls from a single master control made in accordance with this invention, connections to the sub-controls being in parallel. Since the master control member and the sub-control member are identical I have shown only one of them mechanically and have shown for the other the corresponding electrical diagram.

Mechanically each one of the several control devices comprises a rectangular field core 5 open at its center and made up of laminations held together by rivets 6. Both sides of the field core are provided with centrally projecting pole pieces 7, the pole pieces on one side of the core being off-set or staggered with respect to the pole pieces on the other side thereof.

An armature core member 8 is slidable within the field core 5. The armature core member is also laminated and it may conveniently be guided for reciprocation by reducing the vertical extent of certain of these laminations to provide slots at 9 into which the special laminations 10 of the field core project. In effect the laminations 10 comprise rails upon which the armature core slides. In order to eliminate sticking I prefer to make the laminations 10 of somewhat reduced thickness as compared with the other laminations and the width of the slots 9. Laminations 10 may conveniently be made of brass although it is also possible to make them of iron or steel like the other laminations.

In order to hold the rails or laminations 10 rigidly in place each such lamination is provided with legs at 11 which fit between and register with the several polar extensions 7 of the laminations comprising the field core 5. These legs 11 are illustrated in Figure 2.

If the position of armature 8 is to be determined by a dial or the like the armature may conveniently be connected to the dial by means of the rack 12, pinion 13 and a shaft 14 upon which the dial may be mounted.

The armature core 8 is provided with poles at 15 complementary to the poles 7 of the field core. Instead of being staggered, however, the armature poles are directly opposite each other so that on one side of the field poles of the armature will register with the poles of the field while on the other side of the field the poles of the field and armature will be mutually offset.

Identical coils 16 are mounted on all of the several poles of the field and armature. In order to permit the poles to be supported no farther than the cross sectional width of one side of a single coil I prefer that the coils should overlap in correspondingly inclined positions as shown in Figure 1.

The electrical connections are best shown in the illustration of the sub-control unit at the lower part of Figure 1, with purposed connections extended to the proper coils in the master control at the top of Figure 1. The leads to the respective armatures are flexible and the two armatures are connected together in series across a source of alternating current supply shown at 18. In order to energize the armatures only two leads at 19 and 20 respectively are required for connection between the master control and each sub-control. Within each armature it will be noted from Figure 1 that the coils on the poles at opposite sides of the armature are connected in series, with the connections to the coils on the lower poles reversed to have at all times opposite polarity from the coils on the upper poles.

The field coils are divided into four groups, of which two are on each side of the field. It will be noted that the lead 21 connecting the field coils of the master control unit with a sub-control unit is connected with the first coil of the field. The first and second coils are in series and have corresponding polarity. With these two coils the ninth and tenth coils are in series, the polarity, however, being opposite. Thence the conductor passes to the opposite side of the field where the sixteenth and fifteenth coils are included in the series connection, the polarity corresponding to the first and second coils at the top of the field. Thence the circuit passes in series through the eighth and seventh coils at the lower side of the field to a common or neutral point or "ground" at 22. The polarity of the eighth and seventh coils on the bottom side of the field corresponds to that of the ninth and tenth coils at the top side of the field.

Similarly the conductor 23 connecting the two units joins in series in the sub-control unit the second and third coils at the top, the tenth and ninth coils at the bottom, the fourteenth and thirteenth coils at the bottom and the third and fourth coils at the bottom. Connections to the coils in all cases are such that the polarity of corresponding coils in diagonally opposite sections of the field corresponds while the polarity of the coils in sections of the field opposite each other on the other diagonal are of opposite polarity to those on the first diagonal.

The particular field shown has sixteen coils on each side of the field divided into four sections of eight coils each. A pair of coils in each section is connected in series with a pair in each other section thus requiring four leads between the several units. In each unit the leads from the pairs of coils remote from the transfer connections 21, 23, etc. are grounded together as shown at 22.

Those skilled in the art will recognize that because of the arrangement above described an alternating current impressed by the source 18 across the leads to the series-connected armatures will magnetically energize the poles of the armatures and impart to them an alternating polarity of a frequency corresponding to that of the source 18. Thereupon induced currents will be set up in the field poles opposite to the poles of the armature in any given armature location and by virtue of the cross connection between the fields of the respective units the current induced in the field of one unit will be transmitted to energize corresponding poles in the field of the other unit.

Since the poles of the armature of the other unit are likewise energized in a manner corresponding to the energization of the armature poles of the first or master unit the result will be a powerful magnetic attraction of energized poles of the sub-unit with each other in a manner tending to maintain the armature of the sub-unit in the identical relative position of the armature in the master unit. This tendency is utilized through any desired mechanical connections such for example as the rack 12 to transmit motion to a driven shaft 14 corresponding identically with the control shaft 14 of the master unit.

If the control shaft of the master unit is rotated or the armature of the master unit is otherwise moved from its original position to a new position, the alternating current in the armature will, in the armature movement, energize different successive series of field poles presented to the armature poles as the result of such movement. The interconnection between the field poles of the several units will produce exactly corresponding excitation of the coils of the sub-unit and corresponding energization of its field poles whereby the armature of the sub-unit will be caused electro-magnetically to partake exactly of the control movement of the master armature.

It will be understood that the particular device is merely an exemplification of the invention. It is possible to use various electrical hook-ups and still achieve the objects herein specified. Corresponding pole-windings in different sections of the field may be connected in a different sequence from that here illustrated and it is also possible instead of connecting the windings of pairs of poles in series in each section to connect only one winding in each section with one winding in each other section. The obvious purpose of connecting two consecutive pole windings in series is to avoid the greater number of leads which would be required between the units if only a single winding in each section were supplied from a single lead. At the same time I avoid the broadness of adjustment which would be involved in the use of a greater number of series windings in each section.

As above indicated the offset of the poles at the upper and lower sides of the field core is unnecessary but serves the purpose of maintaining a more continuous interaction between the several windings and their respective poles than would be possible if there were a more abrupt transition from one polar position to another in the movement of the armature.

It is further to be noted that it is possible to vary the extent of movement as between the master and sub-controls by varying the spacing between poles in the respective units, whereby a relatively slight armature movement in the master unit will produce a greater movement of the armature in the sub-unit or vice versa. The phase relation between the armature and field coils is constant as between the several units but the linear movement may be made quite different as aforesaid.

I claim:

1. A remote control device comprising a plurality of substantially identical units each including a relatively stationary field core and a relatively reciprocable armature core, the said cores being provided with complementary poles, corresponding windings on the poles of the respective field and armature cores, a series connection between corresponding windings of the several units, a portion of the poles of the field core being offset with respect to poles of the armature core of each unit.

2. In a remote control device, the combination of spaced core members having centrally directed poles, guide means extending longitudinally of said core members, a centrally disposed complementary core member reciprocable upon said guide means and provided with outwardly directed spaced poles respectively registrable with predetermined poles of said first mentioned core members, and means for magnetically energizing the several poles of the respective core members.

3. In a remote control device, the combination of spaced core members having centrally directed poles, guide means extending longitudinally of said core members, a centrally disposed complementary core member reciprocable upon said guide means and provided with outwardly directed spaced poles respectively registrable with predetermined poles of said first mentioned core members, and means for magnetically energizing the several poles of the respective core members, said means comprising series connected windings upon the poles of said reciprocable core member, and secondary windings upon the poles of said stationary core members.

4. In a remote control device, the combination of spaced core members having centrally directed poles, guide means extending longitudinally of said core members, a centrally disposed complementary core member reciprocable upon said guide means and provided with outwardly directed spaced poles respectively registrable with predetermined poles of said first mentioned core members, and means for magnetically energizing the several poles of the respective core members, said means comprising series connected windings upon the poles of said reciprocable core member, and secondary windings upon the poles of said stationary core members, said secondary windings being connected in groups having independent electrical connections.

5. A remote control device including the combination with a pair of core members in spaced relation and each having a series of polar projections extending toward the polar projections on the other of said core members, of a reciprocable core member disposed between said pair of core members and having oppositely disposed series of polar projections complementary to adjacent polar projections on said pair of core members, and windings on individual polar projections of said reciprocable core members.

6. A remote control device including the combination with a pair of core members in spaced relation and each having a series of polar projections extending toward the polar projections on the other of said core members, of a reciprocable core member disposed between said pair of core members and having oppositely disposed series of polar projections complementary to adjacent polar projections on said pair of core members, and guide means extending longitudinally of said core members upon the polar projections whereby to maintain spacing between said projections.

HUGH G. PHELPS.